E. E. HENDRICK.
PROCESS OF REDUCING TEMPERATURE.
No. 10,725. Reissued May 18, 1886.
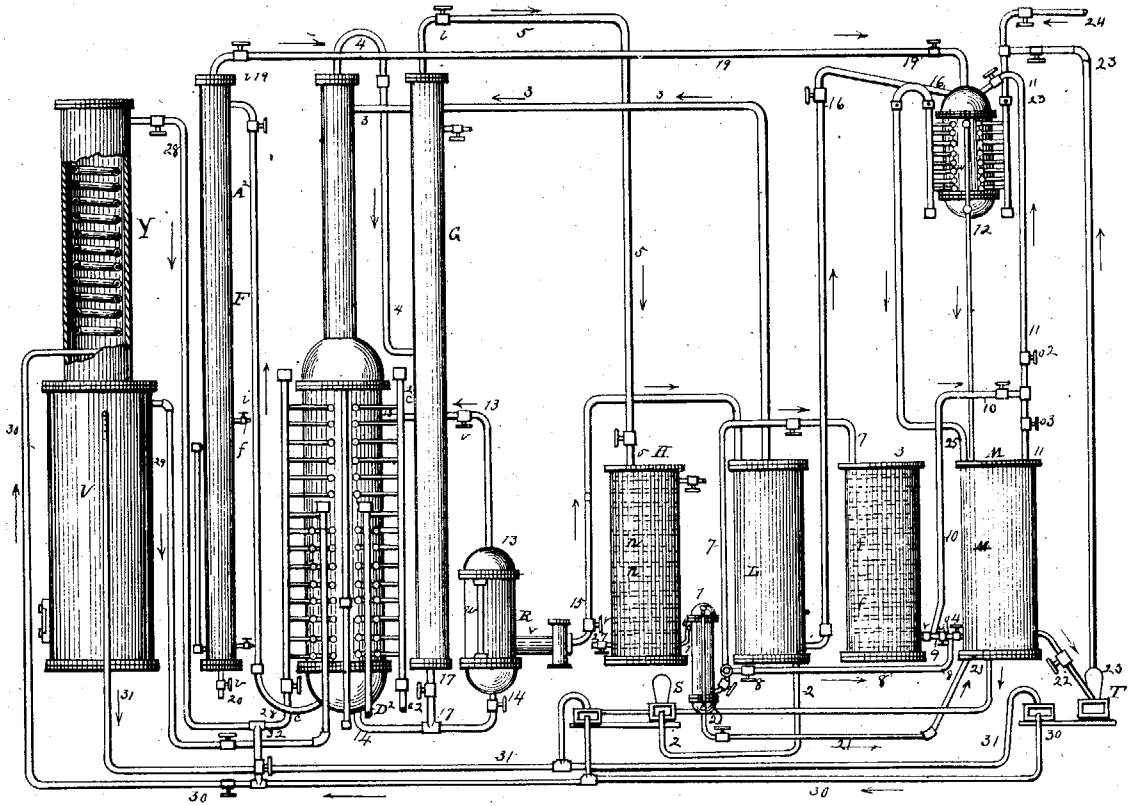
Witnesses
W. F. Huntemann
Ira R. Steward.
Inventor
Eli E. Hendrick
By his Attorney
John R. Bennett

UNITED STATES PATENT OFFICE.

ELI E. HENDRICK, OF CARBONDALE, PENNSYLVANIA.

PROCESS OF REDUCING TEMPERATURE.

SPECIFICATION forming part of Reissued Letters Patent No. 10,725, dated May 18, 1886.

Original No. 336,234, dated February 16, 1886. Application for reissue filed April 24, 1886. Serial No. 200,081.

*To all whom it may concern:*

Be it known that I, ELI E. HENDRICK, a citizen of the United States, residing at Carbondale, Lackawanna county, in the State of Pennsylvania, have invented certain new and useful Improvements in Processes of Reducing Temperature, or, as it is commonly called, the "artificial production of cold," depending on the liberation of ammonia-gas from its aqueous solution, its subsequent condensation under pressure to a fluid, and its expansion into a gaseous form again, of which the following is a specification.

My invention also relates to improvements in the apparatus necessary to carry out the said improved process.

My invention, as far as it relates to the process, consists, first, in the use of exhaust-steam, or steam which has already been employed in the performance of mechanical work, to liberate the ammonia-gas from its aqueous solution, and in so proportioning the strength of the aqua-ammonia employed that the ammonia-gas liberated from it shall have the tension required for its condensation to a liquid at any reasonable temperature of the cooling-water.

Secondly, the process consists in superheating the exhaust-steam thus employed.

Thirdly, the process consists in the employment of steam direct from the boiler in conjunction with the exhaust-steam, either superheated or otherwise, for the purpose of aiding the liberation of the ammonia-gas.

My improvements in the apparatus consist in the combination of a boiler, a steam pumping-engine, or other steam-engine, and a still with pipes connecting the boiler to the steam-induction of the steam pumping or other steam engine, and the exhaust-passage of the steam pumping or other engine with suitably arranged steam-coils in the still, of a boiler, a steam-engine, and a still connected as above described, and also having a pipe connecting the still directly to the boiler, and of a boiler, a steam pumping-engine or other steam-engine, a still, and a superheater, these parts being connected by pipes as follows: The boiler being connected with the pumping-engine, the exhaust of the pumping-engine with the superheater, the superheater with the still, and the boiler also being connected directly with the still.

The drawing forming a part of this specification is an elevation (with portions removed to show the interior construction) of an apparatus suitable for carrying out my invention, and it is of the best form known to me at present.

I do not show further details of the various parts of the apparatus, for these are sufficiently set forth in the specification of Letters Patent of the United States No. 336,233, dated February 16, 1886, and because, that while this apparatus is the best with which I am acquainted for the purpose of carrying out my invention, the latter is not restricted to the precise form of the apparatus represented.

A is the body of the still, having an upper section, $A^2$, which I prefer to place immediately over the body or lower section, A, as shown in the drawing.

U is the boiler, provided with a superheater, Y.

C is a steam-conducting pipe or manifold whose branches are connected with the supply ends of the heating-coils within the still, and also with the exhaust-passages of the steam pumping-engines S and T.

$C^2$ is a waste-steam manifold connected with the waste ends of the coils in the still.

D and $D^2$ are respectively a steam-manifold and a waste-manifold, of which D is connected directly to the boiler, while the other terminates in a steam-trap of the ordinary construction, which, being well known, is not shown in the drawing.

Y is a superheater, which may be heated in any convenient way, but which, from motives of economy, is best heated by the waste heat in the boiler-chimney. This superheater is connected with the exhaust-pipes of the pumps and with the heating-coils in the still, and these pipes are also connected with each other, and are provided with suitable valves to shut off the superheater in case of necessity.

F is the supplementary still for removing the final remnant of gaseous ammonia from the weak ammonia when it is found necessary to re-enforce the liquor in the still.

G is a trap to condense and detain any aqueous vapor that may be driven off with the gaseous ammonia.

H is the condenser, which is simply an outer vessel containing a pipe-coil surrounded by flowing water.

I is the anhydrous-ammonia receiver.

L is the interchanger for utilizing the heat of the hot weak ammonia as it passes to the absorber to heat the cold strong ammonia as it passes to the still.

M is an outer tank filled with a liquid non-congealable at the temperature which it is desired to produce, and having within it tanks for the strong ammonia, surrounded by an absorbing-coil, the non-congealable liquid in the tank M being cooled by a second coil, through which the spent ammonia-gas from the refrigerating or chilling coil contained in tank J passes.

K is the absorber, provided with cooling-coils, through which water or other cooling-liquid can circulate.

R is the regulator to keep the aqua-ammonia in the still A at the required height.

S is a steam pumping-engine which draws the strong ammonia from its reservoir within a tank, M, and forces it to the top of the still.

T is a steam pumping-engine which forces the cooling-liquid surrounding the strong-ammonia receiver in M to circulate through the coils in the absorber K when the water entering the said coils through pipe 24 is not sufficiently cold.

In the operation of ammonia ice-machines heretofore one of two systems has been adopted. According to one system the ammonia-gas is liberated by heat from commercial aqua-ammonia of the strength of about 26° Baumé, and a difficulty arises, which is, that in warm climates and in summer, even in this country, the temperature of the available water used for cooling the condenser is too high to permit the ammonia-gas to reach a sufficiently-high tension to condense to the liquid condition without the employment of steam of high pressure to liberate the ammonia gas from its aqueous solution. According to the other system mechanical compressors are employed to compress the ammonia-gas to the tension required to permit its condensation by the cooling-water available for that purpose. To each of these methods there is the objection that they involve the consumption of a large amount of fuel, and of course are expensive.

I have discovered that the necessary tension of the ammonia-gas can be obtained without the aid of mechanical compressors and with the use of only steam of low tension as a liberating agent at any reasonable temperature of the cooling-water, by increasing the strength of the aqua-ammonia employed above the strength of 26° Baumé in about the proportion of one-third of a degree Baumé for each degree of rise of the temperature of the water (above about 55° Fahrenheit) used to cool the condenser. The discovery of this principle enables me to make use of exhaust-steam as the liberating agent, and thus, by utilizing a waste product, rendering the production of ice or artificial cold very much cheaper.

The objection to the use of exhaust-steam as the liberating agent in this class of apparatus is, that unless the cooling-water is at or below a temperature of about 55° Fahrenheit, the ammonia-gas from the aqua-ammonia usually employed (say about 26° Baumé) under the tension attainable by the use of exhaust-steam (say the tension of about one hundred pounds to the square inch) will not condense to the liquid condition. A proper increase above 26° Baumé in the strength of the aqua-ammonia in the still completely overcomes this difficulty, and enables me to use steam of low tension, which has already accomplished mechanical work, and which has hitherto been discharged into the atmosphere without further useful service. I have also found that the exhaust-steam from the steam pumping-engines required for various offices in the apparatus—such as pumping the aqua-ammonia from the strong-ammonia tank to the still, circulating the cooling-liquid around or in the absorber, pumping the cooling-water for the condenser when a natural flow cannot be obtained, and circulating the non congealable liquid through the pipes in the rooms or through the tanks to be cooled—is sufficient in many cases to liberate the ammonia-gas from the aqua-ammonia in the still. When the exhaust-steam from this source of supply is not sufficient, it can be obtained as a waste product from other steam-engines which may be in the vicinity, and when there is a failure of all these as sources of exhaust-steam, or when from any other causes it may be desirable to obtain a larger supply of heat for the still, steam can be taken to the coils of the still direct from a steam boiler or generator. I have further found it desirable to superheat the exhaust-steam by passing it through any convenient form of superheater—such, for instance, as the one shown in the drawing, which consists of a simple worm-coil. Though this superheater can be of any form, and may be heated in any manner, as a matter of preference I place it so as to be heated by the superfluous heat from the furnace used to heat the steam boiler or generator for supplying steam to the pumping-engines, and thus further economize the heat.

For the proper working of the above-described process it is necessary to provide some means to enable the liquid in the absorber to take up sufficient ammonia-gas to keep the strength of the aqua-ammonia up to the working-point. The strength of the aqua-ammonia in the absorber is dependent upon two conditions—viz., the temperature of the absorber and the pressure of the ammonia-gas contained therein. Either of these elements can be varied, and in the form of apparatus which I have shown I vary both to a certain extent. I add to the pressure in the absorber by making it of two sections, which I denominate the "primary" absorber and the "secondary" absorber, and by elevating the first above the second, preferably not less than thirty feet, so as to obtain a pressure in the second section of the absorber, and also by cooling both sections of the absorber by one circulation, and in the case of the second section of the absorber by the spent gas from the expanding or freezing coils. The details of the construction and operation of this absorber are more fully set forth in the specification of Letters Patent of the United States No. 336,233, dated February 26, 1886, and therefore I do not deem it necessary to describe them herein. The weak ammonia in the absorber will only absorb an amount of vapor due to the temperature and pressure therein, which is not enough to enable the exhaust-steam of 212° to create sufficient tension in the still to cause the ammonia-gas to liquefy in the condenser H when the cooling-water is above about 55° Fahrenheit temperature. With aqua-ammonia of commercial strength of about 26° Baumé—212° Fahrenheit—heat will raise the pressure of the ammonia-gas in the still to about one hundred pounds. With only one hundred pounds pressure in the condenser and a temperature of about 55° Fahrenheit the ammonia-gas will be condensed to a liquid and freezing-work can be performed; but when the cooling-water is materially above 55° Fahrenheit a higher pressure must be maintained in the still and condenser, and either steam of a higher temperature than 212° Fahrenheit or ammonia stronger than 26° Baumé must be used; and in order to utilize the exhaust-steam whenever water below about 55° temperature cannot be obtained for condensation and for cooling the absorber I adopt the method of applying a medium cooled artificially to the absorber or by applying increased pressure in a section of the absorber, or both, as previously described; or I take a portion of steam directly from the boiler to some of the heating-pipes arranged in the still for that purpose, or I use two or more of these methods. At a temperature of 50° Fahrenheit and atmospheric pressure water will absorb six hundred and seventy volumes of ammonia-gas, and the resulting aqua-ammonia will have a specific gravity of 0.875, or about 31° Baumé, and at the same temperature, with a pressure of two atmospheres, water will absorb about thirteen hundred volumes of ammonia-gas and have a specific gravity of about 0.825, or about 41° Baumé, and will boil at a temperature of about 10° Fahrenheit at atmospheric pressure. At a pressure of one hundred and sixty pounds above the atmosphere a temperature of 212° will liberate ammonia-gas and reduce the strength of ammonia of 41° Baumé to about 26° Baumé, giving, with a temperature of 80° Fahrenheit in the condenser, a working margin of about 15° Baumé, or three hundred volumes of gas.

In order to avoid carrying a higher pressure in the absorber K, which determines the pressure in the expanding or freezing coil, I use the absorber in two sections—the upper, K, of which is raised above the lower, P—and I connect the two by a pipe, so as to obtain a column of mixed gas and liquid between the two, which increases the pressure in the absorbing-coil of the lower section of the absorber, and reduces the pressure in the upper section of the absorber.

The operation is as follows: The steam-boiler U or generator being put in operation, and the water therein being converted into steam of suitable tension to work the pumping-engines S and T, say, into steam of seventy pounds pressure above the atmosphere, the reservoir in the tank M is charged with aqua-ammonia, and the pumping-engines are started and utilize the practical available mechanical force of the steam. The aqua-ammonia is pumped by the pumping-engine S from the said reservoir to the top of the upper section of the still, and the exhaust-steam from the steam pumping-engines S and T is conducted through the superheater and the pipes into the heating-pipes in the body of the still. The aqua-ammonia pumped into the top of the still descends through the pans in the upper section of the still, is distributed upon the coils therein, and in its passage downward is heated by the inherent heat of the superheated exhaust-steam in the coils, and the ammonia-gas is liberated. The ammonia-gas ascending in the still passes off through pipe 4 to the trap G, where the gas leaves the vapor of water, which is mechanically mixed with it, and thence passes out through pipe 5 to the condenser H, in which the ammonia-gas is condensed into anhydrous liquid ammonia, which is collected in the receiver I, and is allowed to flow into the expanding coils contained in J, where it performs freezing work. The expanded gas is permitted to escape through pipe 10 into the absorber K, where it is met by a spray of weak ammonia delivered by pipe 16. This weak ammonia is obtained from the still. It passes out of the still through pipe 14 into the regulator R, and thence by pipe 15 to and through the interchanger L, and thence through pipe 16 to the upper part of the primary absorber K. The gas and weak ammonia unite in K to form strong ammonia, and the operation is completed in a secondary absorbing-coil in the tank M, to which the aqua-ammonia from K passes by the connecting pipe 12. From this secondary absorber the strong ammonia enters the reservoir, which is also contained in M, whence it is drawn by the steam-pump S to go back to the top of the still on its cycle again. The strong ammonia, on its way to the top of the still, is passed through the coil of pipe in the interchanger L, where it receives a preliminary heating from the weak ammonia, which is passed through the interchanger in the reverse direction, and as the ammonia drips from pan to pan in the upper section of the still it is further heated by the ammonia-gas, which is liberated in the body of the still. In case the quantity of exhaust-steam from the steam pumping-engines is not sufficient to liberate the required quantity of ammonia-gas, steam from the boiler is taken directly to the body of the still through the manifold D, and is admitted into the heating-coils connected with that manifold, in which case the ammonia is liberated in part by the heat of the superheated exhaust-steam, and in part by the heat of steam taken directly from the boiler. In case of any accident to the superheater, it may be shut off, and connection may be opened so that the exhaust-steam from the steam-engine passes directly without being superheated to the heating-coils of the still. When the temperature of the available condensing-water is too high to effect the condensation of the anhydrous ammonia at the pressure at which it is desirable to operate it, the aqua-ammonia in the still must be re enforced. This may be done in several modes. Thus, the secondary still may be charged with commercial aqua-ammonia, and the gaseous ammonia may be liberated from it by heat and conducted to the condenser; or anhydrous ammonia may be introduced into the still, the part of the apparatus into which the anhydrous ammonia is preferably introduced being the reservoir of the strong ammonia; or the weak aqua-ammonia in the bottom of the primary still may be run into the secondary still and its aqueous ammonia may be liberated from it, while fresh commercial ammonia may be introduced into the primary still. By either of these proceedings the strength of the aqua-ammonia in the apparatus may be strengthened to the requisite extent for the temperature of the condensing-water and for the pressure which it is expedient to maintain in the apparatus, as previously described.

Having now fully described my invention, what I claim, and desire to secure by Letters Patent, is—

1. The process, substantially as before set forth, of producing anhydrous liquid ammonia from aqua-ammonia by the heat of steam and pressure, which consists in subjecting the aqua-ammonia under pressure to the heat of steam of low tension and in increasing the strength of the aqua-ammonia as the pressure under which the ammoniacal gas is liberated is increased.

2. The process, substantially as before set forth, of producing anhydrous liquid ammonia from aqua-ammonia in confinement by the heat of steam and by condensation, which consists in subjecting the aqua-ammonia in confinement to the heat of steam, in cooling the ammoniacal gas by water, and in increasing the strength of the aqua-ammonia as the temperature of the cooling-water is increased.

3. The process, substantially as before set forth, consisting of the following three operations, viz: first, the conversion of water into steam of a tension suitable for use in a steam-engine; second, the passage of the steam through an engine, whereby the tension of the steam is mainly utilized for the production of power; third, the passage of the spent or exhaust steam from the engine to the still, whereby the heat of the exhaust-steam is utilized for the separation of gas from the liquor in said still.

4. The process, substantially as before set forth, consisting of the following four operations, viz: first, the conversion of water into steam of a tension suitable for use in a steam-engine; second, the passage of the steam through an engine, whereby the tension of the steam is mainly utilized for the production of power; third, the superheating of the exhaust-steam from the engine; fourth, the passage of the superheated exhaust-steam to the still, whereby the inherent heat of the superheated exhaust-steam is utilized for the separation of gas from the liquor in said still.

5. The combination, substantially as before set forth, of the steam-generator, the steam-engine, and the still by pipes which connect the steam-generator with the still through the intervention of the steam-engine, whereby the tension of the steam is mainly utilized in the said engine and the inherent heat of the exhaust-steam from said engine is utilized in the liberation of gas from the liquor in said still.

6. The combination, substantially as before set forth, of the steam-generator, the steam-engine, the superheater, and the still by pipes, whereby the tension of the steam is mainly utilized in the said engine and the inherent heat of the superheated exhaust-steam is utilized in the liberation of gas from the liquor in said still.

7. The combination, substantially as before set forth, of the steam-generator, the steam-engine, and the still by means of pipes which not only connect the said still with the steam-generator through the intervention of the steam-engine, but also connect said still directly with said generator, whereby the contents of said still may be heated in part by the heat inherent in the exhaust-steam and in part by the heat of steam taken directly from the steam-generator.

In witness whereof I have hereunto set my hand this 15th day of April, A. D. 1886.

ELI E. HENDRICK.

Witnesses:
W. G. BUTTON,
E. S. McDONALD.